United States Patent [19]

Salvatori

[11] 4,324,461
[45] Apr. 13, 1982

[54] CONTACT LENS FOR NON-ROTATIONAL ORIENTATION

[75] Inventor: Anthony L. Salvatori, Sarasota, Fla.

[73] Assignee: Salvatori Ophthalmics, Inc., Sarasota, Fla.

[21] Appl. No.: 97,503

[22] Filed: Nov. 26, 1979

[51] Int. Cl.³ .............................................. G03B 21/46
[52] U.S. Cl. ............................... 351/160 H; 351/161
[58] Field of Search ................ 351/161, 160 R, 160 H

[56] References Cited

U.S. PATENT DOCUMENTS

| | | | |
|---|---|---|---|
| 3,279,878 | 10/1966 | Long | 351/161 |
| 3,339,997 | 9/1967 | Wesley | 351/161 |
| 3,431,327 | 3/1969 | Tsuetaki | 351/161 |
| 3,614,218 | 10/1971 | Bronstein | 351/161 |
| 3,726,587 | 4/1973 | Kendall | 351/161 |
| 3,962,505 | 6/1976 | Avery | 351/162 X |
| 4,071,293 | 1/1978 | Avery | 351/160 |

OTHER PUBLICATIONS

Moss, Herbert L., "Semi-Sclero-Corneal Flange Lens for Correcting Residual Astigmatism", Journal of the American Optometric Assoc., vol. 31, No. 1, Aug. 1960, pp. 57, 58.
Hersh, Donald, "Use of Eccentrically Ground Secondary Curve in Relief of 'Fine' Contact Lens Symptoms", The Optometric Weekly, vol. 51, No. 8, pp. 377–380, Feb. 1960.
Mandell, Robert B., "A No-Jump Bifocal Contact Lens", Optometric Weekly, vol. 58, No. 22, Jun. 1, 1967, pp. 19–21.
Braff, Solon M., "A New Corneal Lens Design for the Correction of Residual Astigmatism", The Optometric Weekly, vol. 61, No. 1. Jan. 1970.

*Primary Examiner*—Conrad J. Clark
*Attorney, Agent, or Firm*—Baldwin, Egan, Walling & Fetzer

[57] ABSTRACT

A contact lens for the correction of astigmatism or presbyopia and for the correction of "high riding" lenses being of lenticular construction. This invention avoids unwanted increase in center thickness of the lens and unwanted prism in the central area. The curved lenticular carrier portion of the lens, the non-visual portion, is constructed with a concentric curve cut which produces a thick lens edge. The lenticular carrier is also provided with a second eccentric curve cut, with respect to the visual axis of the lens, to provide a thickness disparity between the superior and inferior portions of the lens and to provide an offset center of gravity and a desirable rotational positioning of the lens in the eye of a wearer, particularly when the lens is of astigmatic or bifocal type.

5 Claims, 7 Drawing Figures

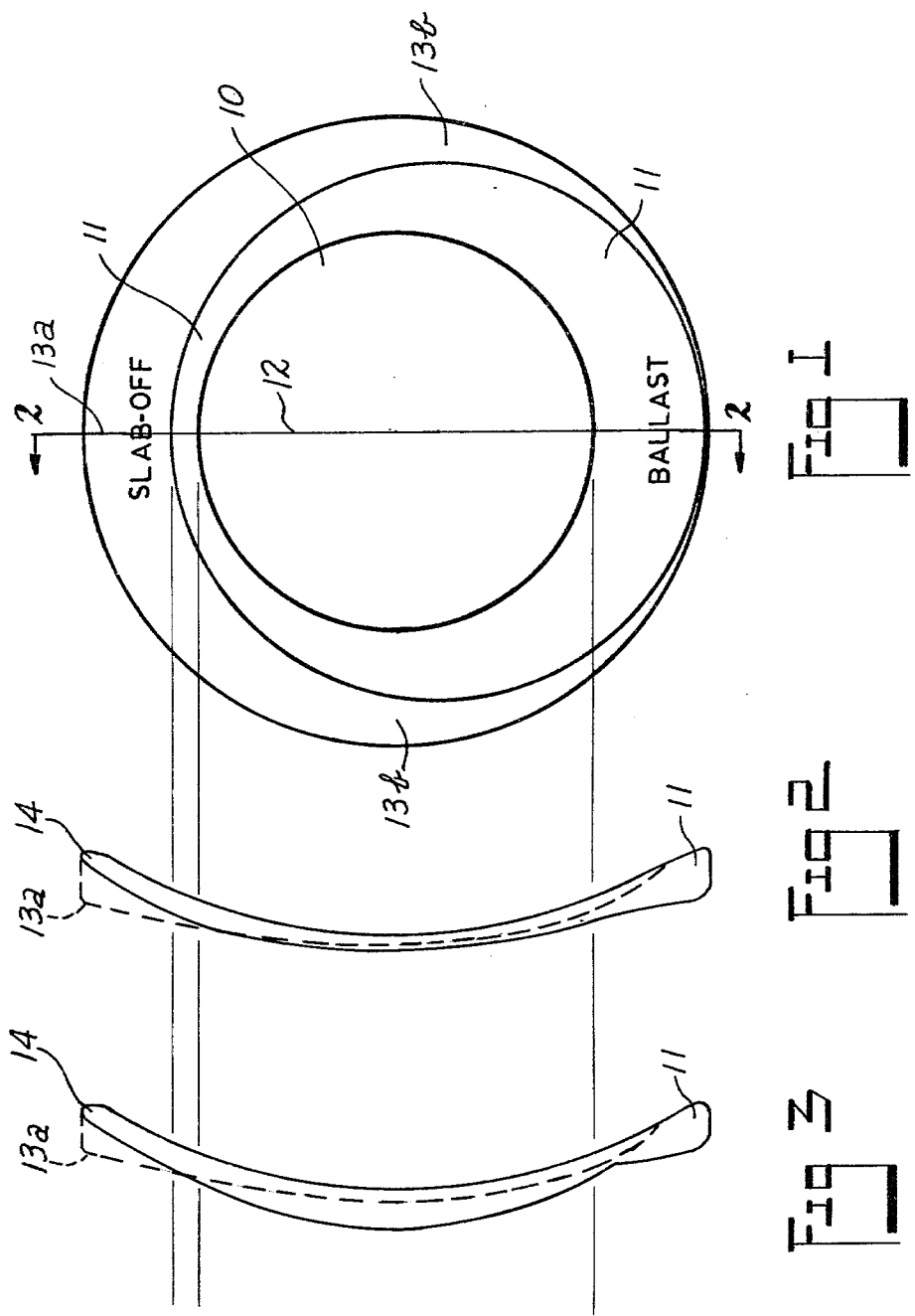

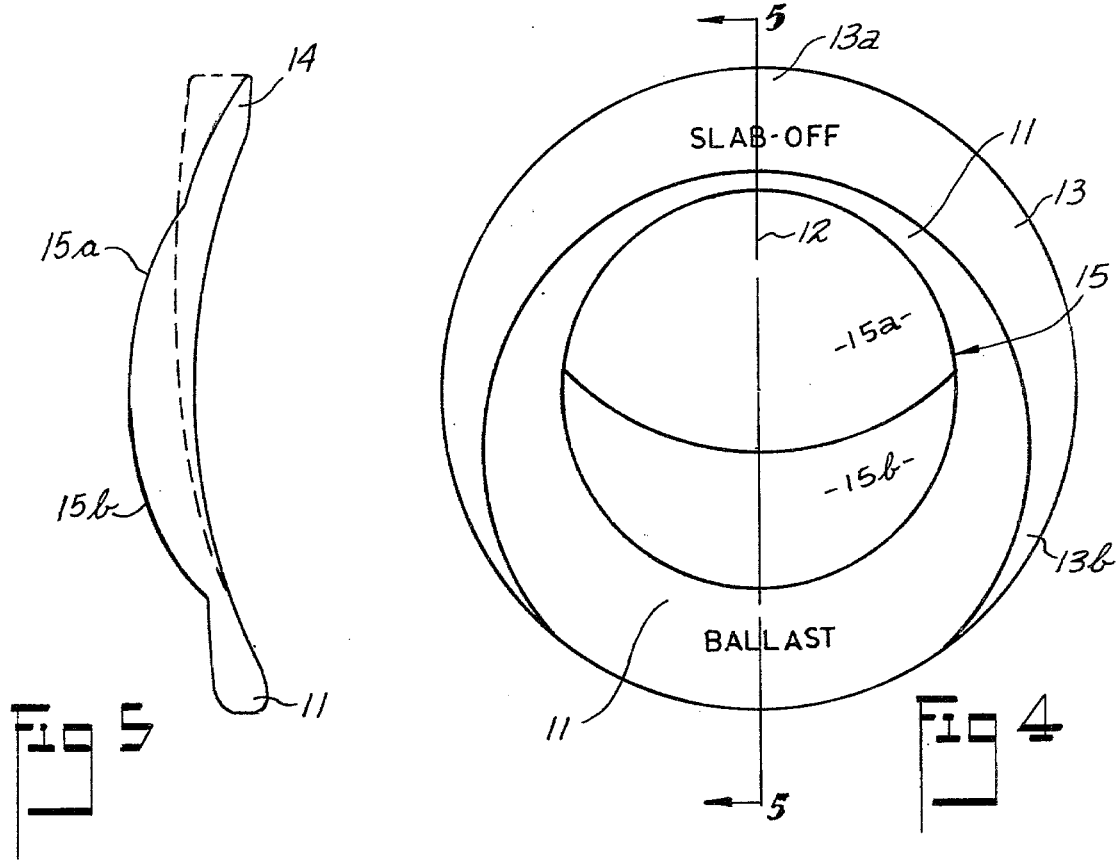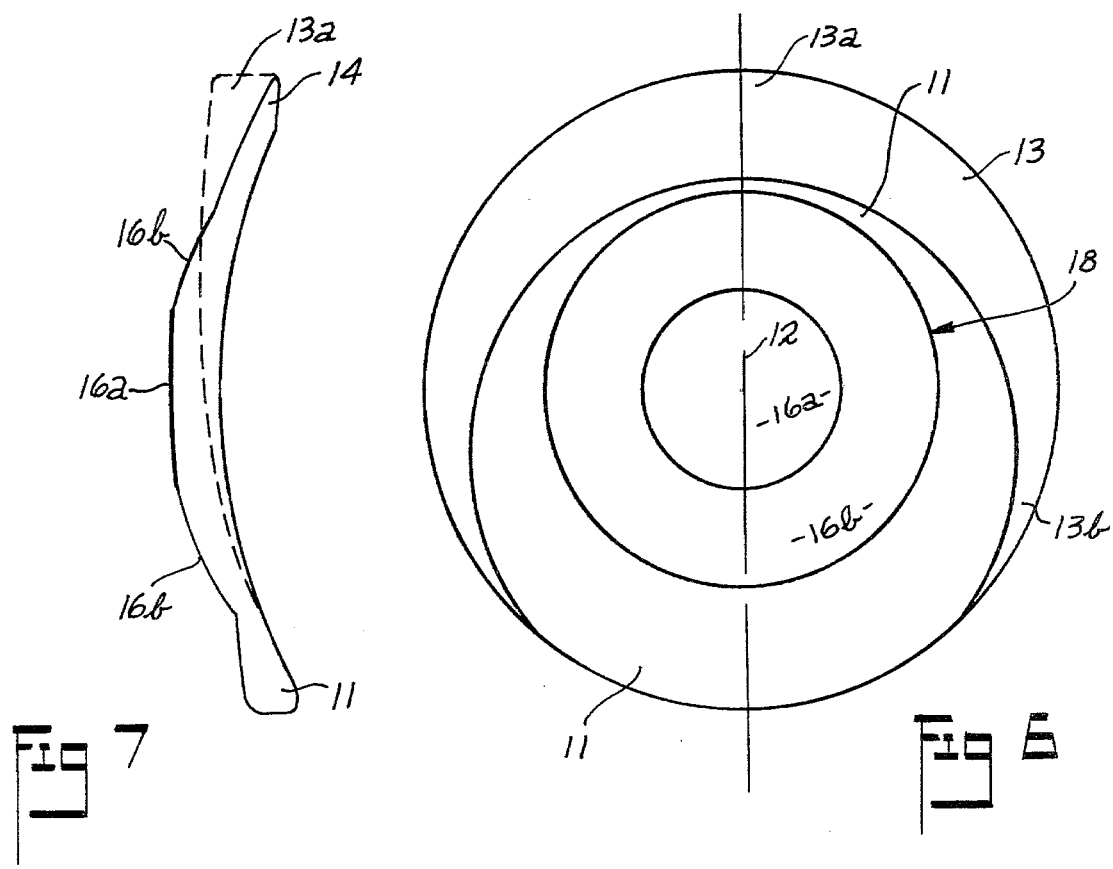

CONTACT LENS FOR NON-ROTATIONAL ORIENTATION

FIELD OF THE INVENTION

This invention relates to optic article shaping or treating, especially to provide an astigmatic and multifocal type of contact lens or blank.

DESCRIPTION OF THE PRIOR ART

Other types of contact lenses for the correction of astigmatism or presbyopia are well-known. They employ various designs for maintaining non-rotational positioning. For example: A non-rotational position can be achieved by truncating the lens horizontally. In another method, the periphery of the lens is shaped eccentrically. In still another, more common, method the lens is constructed with prism ballast. Lenses of this type do not form a part of the present invention.

With the advent of soft contact lenses, greatly increased use of contact lenses has occurred. Up until the present time, both hard and soft contact lenses for the correction of astigmatism or presbyopia have used one or more of the aforementioned methods to maintain non-rotational positioning. Each of these methods has known drawbacks. As an example: When a lens is truncated, it frequently becomes dislodged from the eye with eye movements. In another type, where the periphery of the lens is shaped eccentrically, the lens frequently decenters downward causing a visual disparity between the optical axis of the lens and the visual axis. In the prism balast which is by far the more popular type, additional lens thickness is required over the thickness necessary for the prescription itself without prism.

This is a very important drawback since plastic materials today are formulated with the main thought of supplying more oxygen to the cornea to maintain the cornea's normal metabolism. As an example: Cellulose acetate butyrate is gaining widespread use as a hard contact lens material over PMMA, poly methyl methacrylate, because of its increased oxygen transmission. In soft lenses, HEMA, hydroxy ethyl methacrylate, lenses transmit more oxygen depending on the water contant of the material and lens thickness. However, where these materials are constructed in non-rotational lenses for the correction of astigmatism or presbyopia, in the prior art added center thickness is required for the more popular prism ballast construction.

Other ballast type lenses are shown in the following U.S. Pat. Nos.: 3,279,878; 3,339,997; 3,431,327; 3,962,505 and 4,071,293.

SUMMARY OF THE INVENTION

It is well-known that the effect of added thickness has an adverse effect on oxygen transmission and that this added thickness can negate the increased oxygen transmission of the material. For the foregoing reason and for other reasons and because of the shortcomings of certain prior art constructions in fulfilling the desired characteristics of non-rotating lenses for the correction of astigmatism or presbyopia, it is the object of the present invention to provide an improved nonrotating contact lens characterized by constructing the lens to provide non-rotational positioning and provide thickness throughout the optical zone equal to the center thickness of spherical or single vision lenses. This is accomplished by cutting the lenticular carrier for the lens arcuately at the top to provide a thin structure there, and providing an arcuate thicker section at the bottom.

A further object is to maintain coincidence between the optical center of the lens and the optical center of the visual axis.

A further object is to maintain the periphery of the lens geometrically centered with the optical zone.

A further object is to provide a non-rotating lens with the means for vertical displacement when bivisual or bifocal construction is required for presbyopia.

A further object of this invention is to provide a solution to a common problem of "high riding lenses". Quite often because of the irregular shape of the eye and/or the configuration of the lids, a contact lens will fix itself superiorly. The common solution is to introduce prism in the prescription to create a downward weight imbalance. In the present invention, this problem is readily solved without unwanted increase in center thickness and without unwanted prism in the visual area.

Although the principles of the present invention are applicable to a variety of optical devices, the invention will be described with reference to non-rotating contact lenses for the correction of astigmatism or bifocal use and constructed of any material suitable to be worn on the eye.

It is not the intention here to describe the methods used to produce astigmatic or presbyopic lenses. The methods are well-known to those versed in the art.

BRIEF DESCRIPTION OF THE DRAWINGS

Referring now to the drawings:

FIG. 1 shows a front plan view of one embodiment;

FIG. 2 shows a side elevational view taken on line 2—2 of FIG. 1 showing the present invention in minus power form;

FIG. 3 shows a side elevational view showing this invention in plus power form;

FIG. 4 shows a front plan view of the present invention in common bifocal form;

FIG. 5 is a side elevational view taken on the line 5—5 of FIG. 4;

FIG. 6 shows a front plan view of the present invention in annular bifocal form;

FIG. 7 is a side elevational view taken along the line 7—7 of FIG. 6.

Referring now to FIG. 1 in which this invention is constructed in sphere or sphero-cylinder form, the lens is first constructed with a minus 13.00 D lenticular carrier in an annulus 11 completely around the lens area 10 although any power carrier can be used that will give a thickness equivalent to the amount of ballast desired. Normally, the amount of thickness at the edge, marked "BALLAST" in FIGS. 1, 4 and 6, is equivalent to one to two diopters of prism although, in practice, we have found that the center of gravity in this invention is lower than prism ballast lenses and requires less prism effect. The lens is then placed eccentrically so the vertical axis 12 of the lens has its upper end opposite the desired lower portion with respect to the viewer.

Next, an area 13 of shorter curvature (for instance, a $-3.00$ D) is cut in the lenticular carrier outside the lens area and cutting the upper portion of the previously constructed annulus as seen at 13a in FIGS. 2 and 3, to provide a thinner area of the carrier in a crescent shape extending from a widest portion 13a on said axis occupying a major portion of said annulus outside said lens area, and extending at 13b about both sides of said annulus downwardly so that said crescent shape terminates toward the lower portion of said annulus, thus producing the configuration referred to in FIG. 1 as "slab-off". This produces a thickness disparity in the carrier portion of the lens and lowers the center of gravity allowing for a pendulum effect for the lens to orientate to a fixed position with the lens axis vertical.

The lenticular carrier is about 0.05 mm to 0.10 mm thick at the upper edge 14, shown in the drawings, so that the eyelid of a wearer will easily slide down over the lens edge 14.

It is understood that the amount of eccentric displacement and curvature used to produce the "slab-off" is interrelated and both these functions can be varied to achieve the most desirable lens configuration.

As an example: The more the lens is displaced eccentrically, a flatter curvature can be used for the "slab-off". Conversely, the less the lens is displaced eccentrically the steeper the curve for the "slab-off" to achieve the same effect as in the foregoing example.

In FIGS. 6 and 7, the same lenticular carrier surrounds a bifocal lens 16 of target type, having a central portion 16a for distance vision surrounded by an annular portion 16b for reading vision. The portions 16 and 16b would fit the patient's prescription.

In FIGS. 4 and 6 the principal axis of vision is 12 which is also the vertical center line of the lenticular carrier.

Example of thickness saving: If we consider two lenses of the same characteristics—one of the present invention and one of prism ballast construction, it can be shown that a 33% savings in center thickness is achieved by the present invention.

Consider in the present invention lens characteristics of:
7.00 mm base curve
+5.00–2.00 astigmatic and/or +3.00 +2.00 bifocal
7.50 mm optical zone
0.10 mm optical zone thickness In FIGS. 4 and 5 there is shown an embodiment of a lenticular carrier having a heavier "ballast" area and a lighter "slab-off" area, as described in FIGS. 1, 2 and 3, surrounding a bifocal lens 15 of known character, having a portion 15a for distance vision which might be between +20.00 to −20.00 diopters, and having an add portion 15b for reading vision which might be anywhere between +1.00 to +3.50 diopters.

By the formula (Creighton's contact lens tables), when S=sagittal depth, r+radius, and D=lens diameter, $$S = r - \sqrt{r^2 - \left(\frac{D}{2}\right)^2}$$

it can be found that in order to obtain a 0.10 mm optical zone juncture thickness, the center thickness will be 0.18 mm.

$$S = 6.59 - \sqrt{6.59^2 - \left(\frac{7.5}{2}\right)^2}$$

$$S = 6.59 - \sqrt{43.428 - 14.06}$$

-continued $$S = 6.59 - \sqrt{29.368}$$

$$S = 6.59 - 5.42$$

$S = 1.17$mm this represents the sagittal depth of the anterior surface or power curve.

Base curve or posterior curve of lens is 7.00 mm.

$$S = 7.00 - \sqrt{7.00^2 - \left(\frac{7.5}{2}\right)^2}$$

$$S = 7.00 - \sqrt{49.00 - 14.06}$$

$$S = 7.00 - 5.911$$

$S = 1.089$ sagittal depth of the base curve.

Therefore, because the power curve is steeper than the base curve, we know that 1.17−1.089=0.081 the difference between the sagittal of power curve and sagittal of base curve gives us the center thickness 0.08 mm when the edge is at 0. Therefore, if you wanted a juncture thickness of 0.10 mm the center would have to be 0.18 mm thick.

Using the same example, if you were going to incorporate prism we would use the prism formula $$T = \frac{d \times p}{49}$$

where
T is thickness of the base of the prism in mm
d is the diameter
P is the prism added $$T = \frac{7.5 \times 1^\Delta}{49} \text{ prism diopter}$$

$$T = \frac{7.5}{49}$$

$T = .153$mm

Therefore, one-half of this thickness would give the center thickness of 0.0765 or about 0.08 mm. This would have to be added to the thickness calculated above 0.18 which plus 0.08=0.26 mm which is a greater center thickness. Thus we find that center thickness must be increased by 0.08 mm, in which case this lens will have a center thickness of 0.26 mm.

The present invention saves considerable thickness and provides a considerable increase in oxygen transmission for a given lens material.

According to Fick's Law of Diffusion where
J=(DK/L) Δp
DK=lens permeability
L=lens thickness
it follows that either a large "DK" or a small "L" will result in higher oxygen transmission (DK/L).

What is claimed is:
1. A contact lens for non-rotational orientation in the eye of a wearer, comprising a substantially circular lenticular carrier having a central concentric optical portion surrounded by a generally annular non-visual portion, and said non-visual portion having a thicker part at the lower part of said lenticular carrier when in the eye of a wearer and having a thinner part at the upper part of said lenticular carrier when in the eye of a wearer, there being no additional prism in the optical lens area.

2. A contact lens for non-rotational orientation in the eye of a wearer as defined in claim 1, wherein said optical portion contains a sphero-cylindrical correction for the eye, whereby said thicker portion of said lenticular carrier prevents rotational movement of said lens in the eye of a wearer.

3. A contact lens for non-rotational orientation in the eye of a wearer as defined in claim 1, wherein said optical portion has a central circular zone powered on the anterior surface for distance vision thereof and has an annular zone surrounding said circular zone powered for near vision with respect to the cornea of the eye of a wearer, whereby said thicker portion of said lenticular carrier serves to allow vertical displacement of said power zones without unwanted prism in said optical portion.

4. A contact lens for non-rotational orientation in the eye of a wearer as defined in claim 1, wherein said optical portion has an upper optical zone powered on the anterior surface for distance vision thereof with respect to the cornea of the eye of a wearer, and said optical portion has a lower optical zone powered on the anterior surface for near vision with respect to the cornea of the eye of a wearer as customary in bifocal lenses, whereby said thicker portion of said lenticular carrier serves to maintain said upper and lower optical zones in the proper position relative to the cornea of the eye of a wearer, without unwanted prism in said optical portion.

5. A contact lens for non-rotational orientation in the eye of the wearer as defined in claim 1 wherein said optical portions contain a sphere correction for the eye whereby said thicker portion of said lenticular carrier provides a downward weight imbalance to correct "high riding" lenses.

* * * * *